US009630694B1

(12) United States Patent
Jaszewski et al.

(10) Patent No.: US 9,630,694 B1
(45) Date of Patent: Apr. 25, 2017

(54) APPARATUSES AND METHODS FOR SERVICING LUBRICATION IN A LOWER GEARCASE OF AN OUTBOARD MARINE ENGINE (71) Applicant: Brunswick Corporation, Lake Forest, IL (US)

(72) Inventors: Wayne M. Jaszewski, Jackson, WI (US); Randall J. Poirier, Fond du Lac, WI (US); John A. Tuchscherer, Oshkosh, WI (US); Gary C. Plonske, DePere, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/950,660

(22) Filed: Nov. 24, 2015

(51) Int. Cl.
*B63H 20/00* (2006.01)
*F02B 61/04* (2006.01)
*B63H 20/14* (2006.01)
*B63H 20/32* (2006.01)
*G01F 23/04* (2006.01)

(52) U.S. Cl.
CPC .......... *B63H 20/002* (2013.01); *B63H 20/14* (2013.01); *B63H 20/32* (2013.01); *F02B 61/045* (2013.01); *G01F 23/04* (2013.01); *B63H 2020/008* (2013.01); *B63H 2020/323* (2013.01)

(58) Field of Classification Search
CPC ...... B63H 20/002; B63H 20/14; B63H 20/32; B63H 2020/323; B63H 2020/008; F02B 61/045; G01F 23/04
See application file for complete search history.

(56) References Cited

U.S. PATENT DOCUMENTS

| 2,969,763 | A | * | 1/1961 | Foster ................. B63H 20/002 33/727 |
| 4,650,430 | A | | 3/1987 | Schiek |
| 4,764,135 | A | | 8/1988 | McCormick |
| 5,352,141 | A | | 10/1994 | Shields et al. |
| 5,462,463 | A | | 10/1995 | Meisenburg et al. |
| 5,487,687 | A | | 1/1996 | Idzikowski et al. |
| 5,522,351 | A | | 6/1996 | Hudson |
| 5,752,866 | A | * | 5/1998 | Takahashi ................ F01M 1/02 123/195 HC |
| 7,467,689 | B1 | | 12/2008 | Batten, Jr. et al. |
| 7,850,496 | B1 | | 12/2010 | Eichinger |

OTHER PUBLICATIONS

Unpublished U.S. Appl. No. 14/585,872, filed Dec. 30, 2014.

\* cited by examiner

*Primary Examiner* — Anthony Wiest
(74) *Attorney, Agent, or Firm* — Andrus Intellectual Property Law, LLP (57) ABSTRACT

An outboard marine engine comprises an internal combustion engine; a lower gearcase, a set of gears disposed in the lower gearcase, the set of gears being configured to transfer power from the internal combustion engine to drive a propulsor to generate a thrust on the outboard marine engine, and a dipstick that extends into the lower gearcase. The dipstick is removable from the lower gearcase and configured to indicate a level of lubrication in the lower gearcase.

11 Claims, 8 Drawing Sheets

APPARATUSES AND METHODS FOR SERVICING LUBRICATION IN A LOWER GEARCASE OF AN OUTBOARD MARINE ENGINE

FIELD

The present disclosure relates to outboard marine engines, and more particularly to apparatuses and methods for servicing lubrication in a lower gearcase of an outboard marine engine.

BACKGROUND

The following U.S. Patents and Patent Applications are incorporated herein by reference in entirety:

U.S. patent application Ser. No. 14/585,872, filed Dec. 30, 2014, discloses a transmission for a marine propulsion device having an internal combustion engine that drives a propulsor for propelling a marine vessel in water. An input shaft is driven into rotation by the engine. An output shaft drives the propulsor into rotation. A forward planetary gearset connects the input shaft to the output shaft so as to drive the output shaft into forward rotation. A reverse planetary gearset connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

U.S. Pat. No. 7,850,496 discloses a lubrication draining and filling system that provides oil passages that direct a flow of liquid oil from a bottom region of an oil sump, located within a rotatable portion of the marine propulsion system, to a discharge port which is connectable in fluid communication with a device that can sufficiently lower the pressure at the discharge port to induce the upward flow of oil from the lower portion of the oil sump within the gear case. The cavity of the oil sump within the gear case is disposed within a rotatable portion of the marine propulsion device while the discharge port is located within a stationary portion of the marine propulsion device. A transitional region comprises a space located between the stationary and rotatable portions. The oil can therefore flow from a rotatable portion, into the space, and then from the space into the stationary portion which allows it to be removed from the marine propulsion device.

U.S. Pat. No. 7,467,689 discloses an arrangement wherein positive pressure is used to induce the flow of a liquid lubricant from a crankcase and through a drain conduit so that used oil can be removed from the engine and collected in a container during an oil change procedure. Positive pressure is introduced into the crankcase, and into an ullage region above the liquid lubricant, by the use of an inlet valve that can be attached to a cam cover to replace a PCV valve temporarily during the oil change.

U.S. Pat. No. 5,522,351 discloses a device to facilitate removal of oil from an outboard motor having an oil tank located in its drive shaft housing. An oil removal tube fitted in a bore through the adapter plate of the motor extends downwardly to the bottom of the oil tank and projects above the adapter plate and terminates inside the cowling for the motor. The top of the tube may be threaded to accept a connector to an oil removal pump.

U.S. Pat. No. 5,487,687 discloses an outboard marine drive having a midsection between the upper power head and the lower gear case and having a removable midsection cowl assembly including first and second cowl sections. The midsection housing includes an oil sump in one embodiment and further includes an exhaust passage partially encircled by cooling water and partially encircled by engine oil for muffling engine exhaust noise. The midsection housing also has an oil drain arrangement providing complete and clean oil draining while the outboard drive is mounted on a boat and in the water wherein the operator can change oil without leaving the confines of the boat and entering the water.

U.S. Pat. No. 5,462,463 discloses a marine drive that has two counter-rotating propellers. Inner and outer concentric counter-rotating propeller shafts are supported by a spool in the lower horizontal bore. Passages are provided in the housing for communicating lubrication and/or exhaust with the horizontal bore. Locking structure holds the driven gears and bearings in place in the lower horizontal bore.

U.S. Pat. No. 5,352,141 discloses a marine drive that has a spool positioned in the lower horizontal bore and supporting a dual propeller shaft assembly. An exhaust passage includes a passage in the drive housing communicating with the horizontal bore at the spool, and a spool exhaust passage passing exhaust rearwardly through the spool to the propeller through-hub exhaust passages, providing through-hub exhaust through dual propellers. An oil passage in the housing communicates with the horizontal bore forwardly of the exhaust passage and lubricates the dual propeller shaft assembly.

U.S. Pat. No. 4,764,135 discloses a marine stern drive unit wherein oil is circulated upwardly from the propeller housing and through the drive shaft sleeve to the upper gear case. A return oil line connects from the upper gear case and downwardly through the lower gear case to the propeller housing. The return line is disposed within a cooling water chamber communicating with the drive engine to create an intercooling or heat exchanging effect whereby the incoming water from a lake or the like cools the recirculating stern drive unit lubricant. A combination of threaded drive shaft and internally grooved sleeve is utilized to pump the oil through the system.

U.S. Pat. No. 4,650,430 discloses a lubrication and circulation system for a marine drive lower gear case. A self-lubricating heat conducting flat thrust washer bearing around the drive shaft has a bottom horizontal surface engaging the top of the pinion gear at the bottom of the drive shaft without needle bearings or roller bearings interposed there between. Lubricant frictionally dragged by the top of the pinion gear across the bottom horizontal surface of the thrust bearing washer is diverted along the slants of slots at an angle to the radius inwardly toward the drive shaft rotating therein. Upper and lower self-lubricating heat conducting sleeve bearings mount the drive shaft for rotation in the lower gear case without needle bearings or roller bearings there between. Each sleeve bearing has a spiral groove in its inner surface in a helical direction driving lubricant upwardly there through along the drive shaft as the latter rotates therein. Lubricant is circulated through the thrust washer bearing and the sleeve bearings to carry heat away from the bearings and substantially increase longevity thereof, matching and exceeding the life rating of needle or roller bearing arrangements for the vertical drive shaft in a marine drive.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter. In certain examples, an outboard marine engine comprises a lower gearcase, a set of gears disposed in the lower gearcase, the set of gears being configured to convey power from an internal combustion engine to a propulsor to generate a thrust on the outboard marine engine, and a dipstick that extends into the lower gearcase. The dipstick is removable from the lower gearcase and configured to indicate a level of lubrication in the lower gearcase.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

During research and experimentation, the present inventors have determined that known methods for servicing lubrication in the lower gearcase of an outboard marine engine are often inconvenient and time-consuming. Conventional outboard marine engines typically have removable fittings that need to be accessed by the operator to add and/or remove lubrication from the lower gearcase. This often requires the operator to either enter the body of water in which the marine vessel is situated or remove the outboard marine engine and/or marine vessel from the water. The present inventors have realized that it would be desirable to provide apparatuses and methods that more conveniently facilitate servicing of lubrication in the lower gearcase, for example that do not necessarily require the operator to enter the water and/or remove the outboard marine engine and/or marine vessel from the water.

Figure 1:
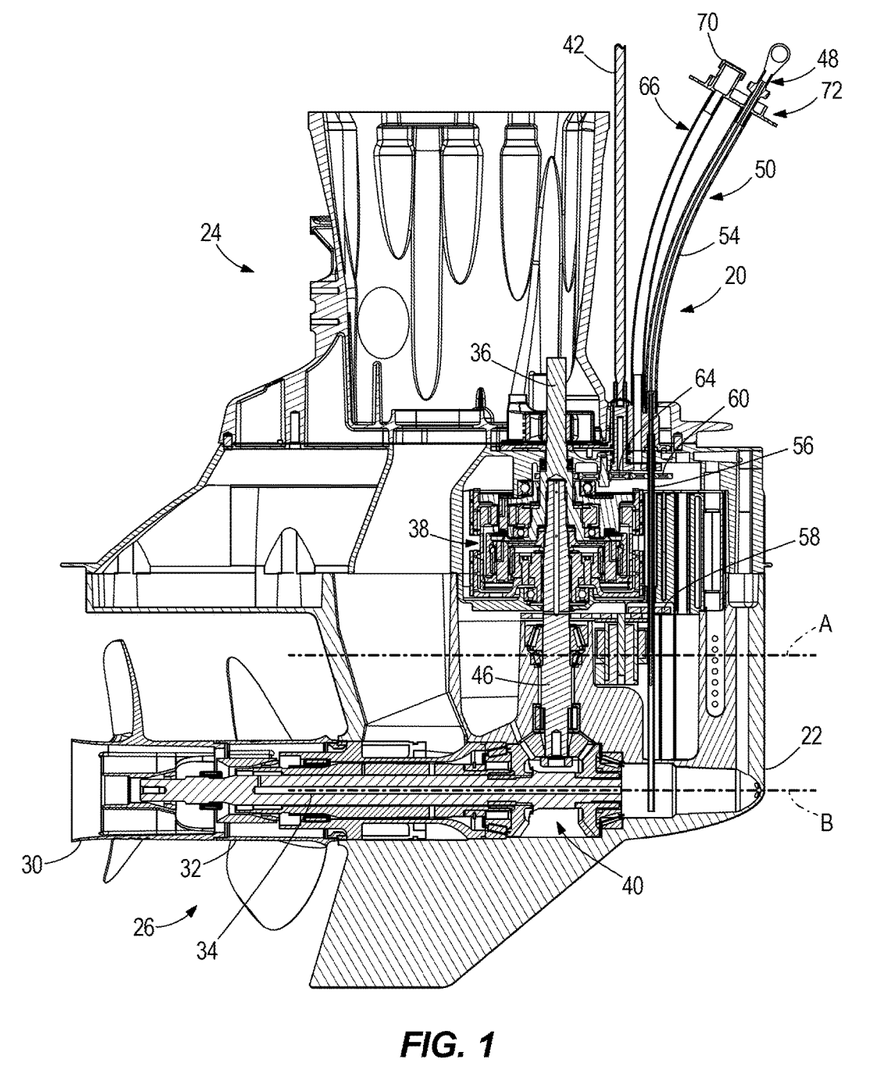
FIG. 1 is a sectional view of a first embodiment of a lower gearcase of an outboard marine propulsion device according to the present disclosure.
Figure 2:
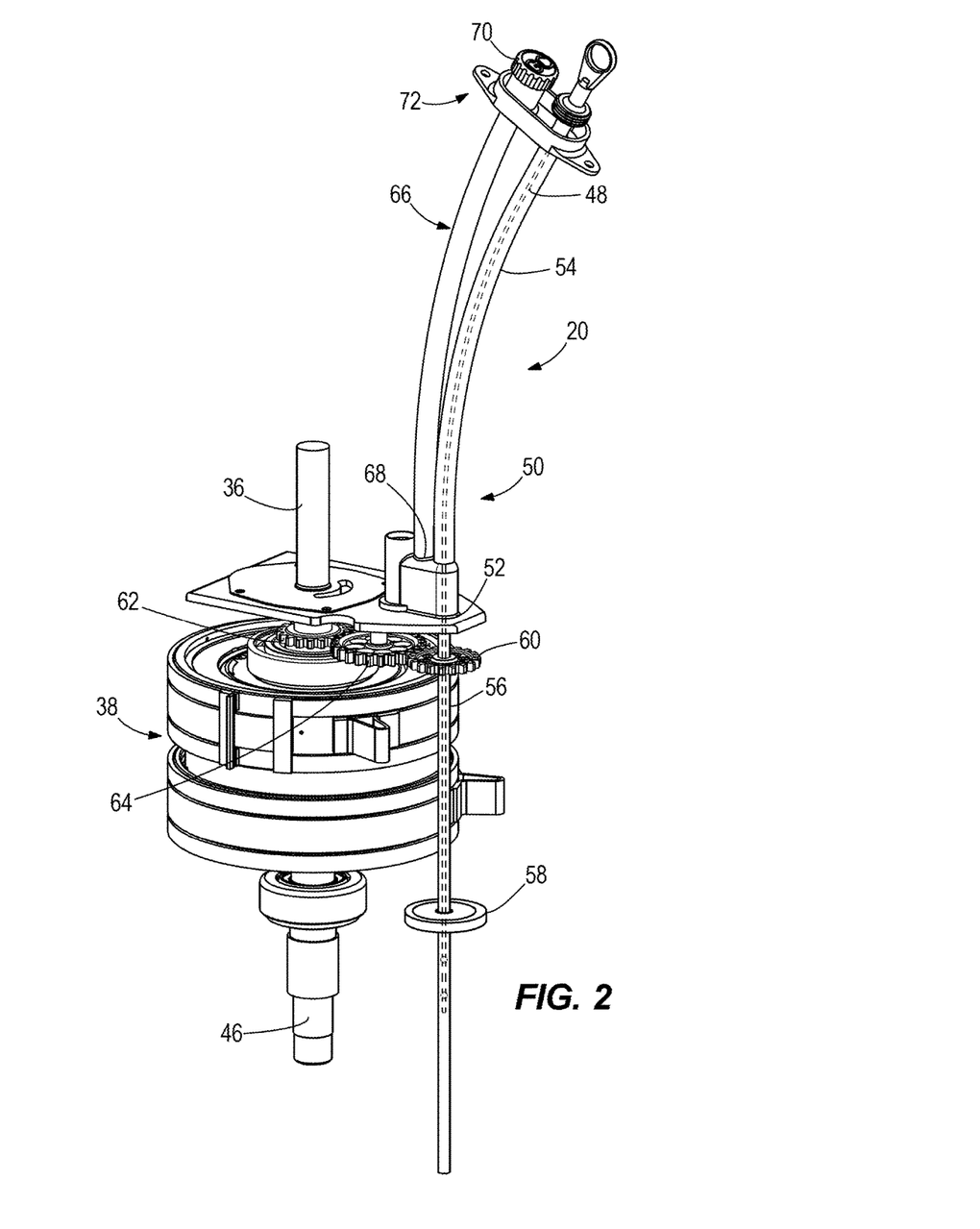
FIG. 2 is an isometric view of an apparatus for servicing lubrication in the lower gearcase shown in FIG. 1.

FIGS. 1 and 2 depict one embodiment of an apparatus 20 for conveniently servicing lubrication in a lower gearcase 22 of an outboard marine engine 24 according to the present disclosure. As is conventional, the lower gearcase 22 supports a propulsor 26, which in this example includes a pair of propellers 30, 32 that are supported for counter-rotation on a propeller shaft arrangement 34. Counter-rotation of the propellers 30, 32 generates a thrust on the outboard marine engine 24, which is transferred to the corresponding marine vessel to thereby propel the marine vessel in a body of water. Although not illustrated in FIG. 1, the outboard marine engine 24 includes an internal combustion engine that drives a vertically-oriented driveshaft 36 into rotation. Rotation of the driveshaft 36 is transmitted to the propulsor 26 via a transmission 38 and a bevel gear arrangement 40. The transmission 38 is actuated by a shift shaft 42 between forward, neutral and reverse gears to thereby transmit the power of the internal combustion engine to the bevel gear arrangement 40 in forward, reverse or neutral gears. The type of transmission 38 can vary and does not need to include a planetary transmission and does not need to be located in the lower gearcase 22. One example of a suitable transmission is provided in the incorporated U.S. patent application Ser. No. 14/585,872. The bevel gear arrangement 40 includes bevel gears 44 that interact with each other to transmit rotation of a vertically oriented output shaft 46 of the transmission 38 to the noted horizontally extending propeller shaft arrangement 34.

According to the present disclosure, the apparatus 20 includes a dipstick 48 that extends into the lower gearcase 22 into a position that is below a desired level A for lubrication in the lower gearcase 22 during an off state of the outboard marine engine 24. The lubrication is for lubricating, for example, the set of gears in the bevel gear arrangement 40. Level B shows the desired, approximate level of lubrication during operation of the outboard marine engine 24. The dipstick 48 is removable from the lower gearcase 22 and upon removal is configured to indicate a level of lubrication in the lower gearcase 22. For example, when the dipstick 48 is removed, the outer surfaces of the dipstick 48 that were disposed below the level A of lubrication are covered or at least partially covered in lubricant. The lubricant disposed on the outer surfaces of the dipstick 48 along with markings on the dipstick together indicate the level of lubricant in the lower gearcase 22 to the operator.

The dipstick 48 extends into a dipstick conduit 50 that is connected to a dipstick opening 52 on the lower gearcase 22. The dipstick conduit 50 has a first portion 54 that is located outside of the lower gearcase 22 and a second portion 56 that is located in the lower gearcase 22. In certain examples, the first portion 54 is made of a polymer material and the second portion 56 is made of a metal material. In this embodiment, a lubrication pump 58 is disposed on the second portion 56. The lubrication pump 58 is configured to pump lubrication through passages in the lower gearcase 22 to thereby lubricate the sets of gears associated with the transmission 38 and/or the bevel gear arrangement 40. The type of lubrication pump 58 can vary from that shown. In the illustrated example, the lubrication pump 58 is a pump that is driven by rotation of the second portion 56 of the dipstick conduit 50. The pump is a conventional item of known design, e.g. gerotor, piston, etc. The noted internal combustion engine drives the noted driveshaft 36 into rotation, which thereby drives the propulsor 26 via the transmission 38 and the bevel gear arrangement 40. The second portion 56 of the dipstick conduit 50 is connected to the driveshaft 36 via a pump gear 60 on the second portion 56, a driveshaft gear 62 on the driveshaft 36, and optionally an intermediate gear 64 that connects the pump gear 60 and driveshaft gear 62. Rotation of the driveshaft gear 62 causes rotation of the intermediate gear 64, which causes rotation of the pump gear 60. Rotation of the pump gear 60 causes rotation of the second portion 56 of the dipstick conduit 50, thereby driving the lubrication pump 58.

A lubrication fill conduit 66 is connected to a lubrication fill opening 68 on the lower gearcase 22 and is disposed at least partially outside of the lower gearcase 22. A removable cap 70 is positioned on the end of the lubrication fill conduit 66 and is positionable in a closed position, as shown in FIGS. 1 and 2, wherein the lubrication fill opening 68 is closed to surrounding atmosphere, and also in an open position (not shown) wherein the lubrication fill opening 68 is open to atmosphere, thus venting the lower gearcase 22 to atmosphere. The configuration of the removable cap 70 can vary from that shown. In this example, the removable cap 70 is connected to the lubrication fill conduit 66 by a threaded connection such that rotation of the removable cap 70 in one direction disconnects the removable cap 70 from the lubrication fill conduit 66 and rotation of the removable cap 70 is the opposite direction connects the removable cap 70 to the lubrication fill conduit 66.

When the removable cap 70 is in the open position, the lubrication fill opening 68 vents the lower gearcase 22 to atmosphere via the lubrication fill conduit 66. Together, the dipstick conduit 50 and the lubrication fill conduct 66 (and the associated lubrication fill opening 68 and dipstick opening 52) are configured such that disposition of the removable cap 70 in the open position and application of a suction force to the dipstick conduit 50 removes lubrication from the lower gearcase 22 via the dipstick conduit 50. The suction force can be provided by an external mechanism such as a vacuum. Several different lubrication extraction devices could be used and are currently available and differ in configuration varying from hand pumps to electrical and pneumatic systems. Advantageously, the dipstick conduit 50 and lubrication fill conduit 66 both extend to a common user interface 72 on the outboard marine engine 24, thereby providing an operator with convenient access to the dipstick 48 and removable cap 70. The location of the common user interface 72 vary, one example of which is described herein below with reference to the embodiments shown in FIGS. 3-10.

FIGS. 3-10 depict another embodiment of an apparatus 100 for servicing lubrication in a lower gearcase 102 of an outboard marine engine 104. The outboard marine engine 104 includes an internal combustion engine 114 that drives the driveshaft 116 into rotation. Rotation of the driveshaft 16 is transmitted to a propulsor 110, in this example a propeller 112, via a bevel gear arrangement 108.

Figure 3:
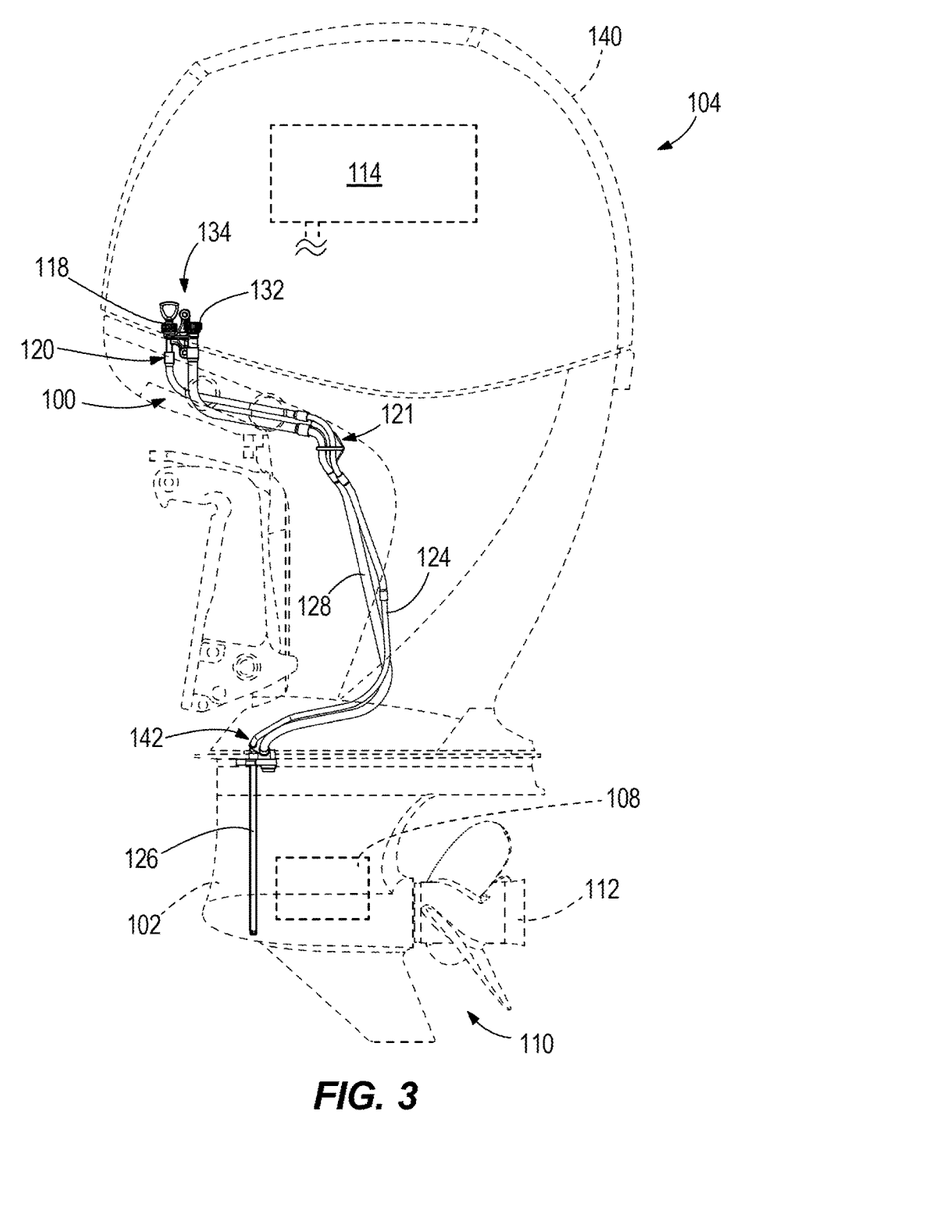
FIG. 3 is a side view, shown partially in phantom line, of a second embodiment of an outboard marine propulsion device having apparatus for servicing lubrication in a lower gearcase of the outboard marine propulsion device.

The apparatus 100 is provided for conveniently servicing lubrication in a lower gearcase 102 of an outboard marine engine 104. The apparatus 100 includes a dipstick 118 that is removable from the lower gearcase 102 and configured to indicate a level of lubrication in the lower gearcase 102, similar to the embodiment discussed herein above with respect to FIGS. 1 and 2. The dipstick 118 extends through a dipstick conduit 120 and a dipstick opening 122 on the lower gearcase 102. The dipstick conduit 120 includes a first portion 124 located outside of the lower gearcase 102 and a second portion 126 located in the lower gearcase 102. Contrary to the examples shown in FIGS. 1 and 2, the second portion 126 is not connected to a lubrication pump.

A lubrication fill conduit 128 is connected to a lubrication fill opening 130 on the lower gearcase 102. A removable cap 132 is located on the free end of the lubrication fill conduit 128 and is positionable in a closed position (FIG. 3) that closes the lubrication fill opening 130 and in an open position (not shown) that opens the lubrication fill opening 130, similar to the embodiment described herein above regarding FIGS. 1 and 2. The lubrication fill opening 130 thus vents the lower gearcase 102 to atmosphere when the removable cap 132 is in the noted open position. The dipstick conduit 120 and lubrication fill conduit 128 (and associated dipstick opening 122 and lubrication fill opening 130) are configured such that placing the removable cap 132 in the noted open position vents the lower gearcase 102 to atmosphere such that applying a suction force to the dipstick conduit 120 removes lubrication from the lower gearcase 102 via the dipstick conduit 120.

Figure 4:
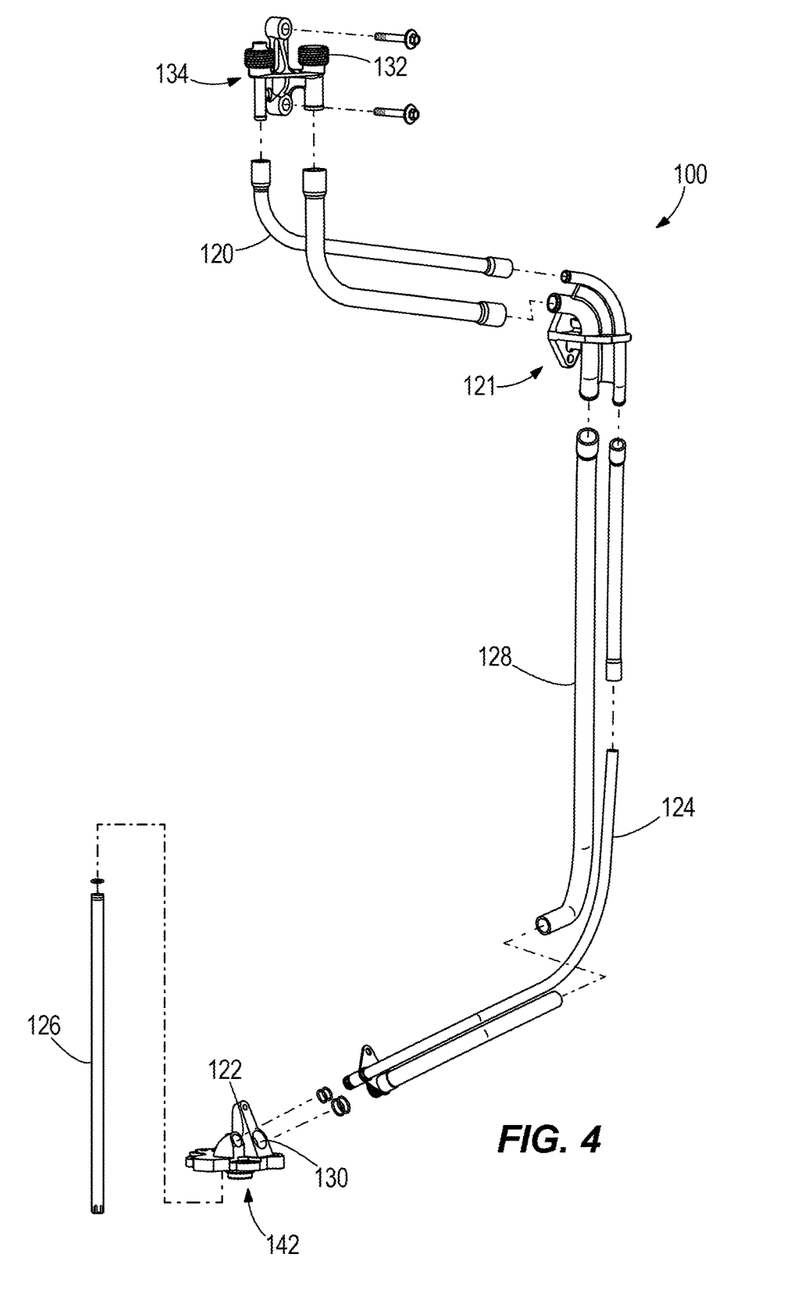
FIG. 4 is an exploded view of the apparatus shown in FIG. 3.
Figure 5:
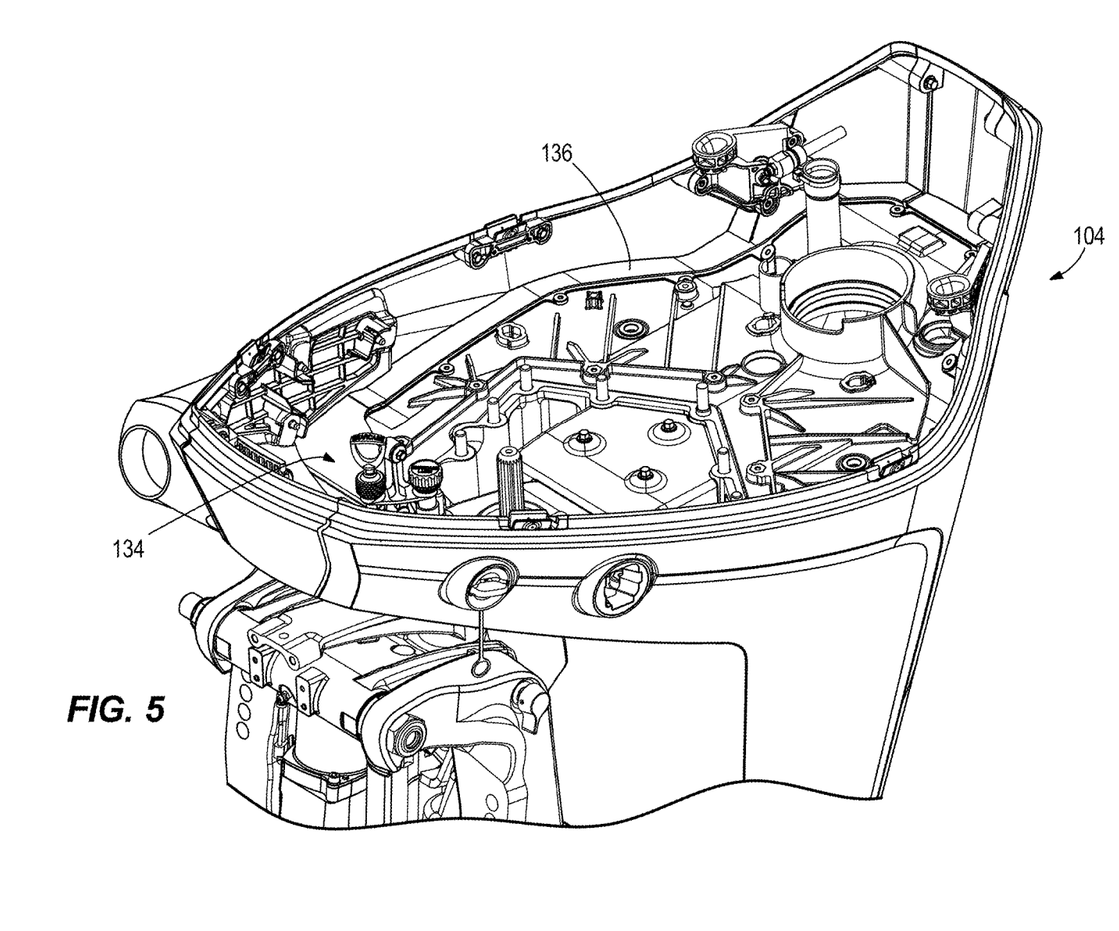
FIG. 5 is a perspective view of the outboard marine propulsion device shown in FIG. 3, having its top cowl removed.

As shown in FIGS. 3-5, the first portion 124 of the dipstick conduit 120 and the lubrication fill conduit 128 both extend to a common user interface 134. In this example, the outboard marine engine 104 includes an adapter plate 136 that is disposed between the lower gearcase 102 and the internal combustion engine 114 of the outboard marine engine 104. The dipstick conduit 120 and the lubrication fill conduit 128 both extend through the adapter plate 136 via a quick-connect fitting 121. However, in other examples, the dipstick 120 and lubrication fill conduit 128 can extend through the adapter plate 136 as continuous lengths of tubing.

The common user interface 134 is located on an opposite side of the adapter plate 136 with respect to the lower gearcase 102 (e.g. the top side of the adapter plate 136). More particularly, the outboard marine engine 104 includes a removable top cowl 140 that covers the internal combustion engine 114. The common user interface 134 is positioned under the removable top cowl 140 and on top of the adapter plate 136. Removal of the top cowl 140 exposes the common user interface 134 so that the operator can easily access the dipstick 118 and removable cap 132 to service the lubrication in the lower gearcase 102. The common user interface 134 does not have to be located under the top cowl 140 and in fact all of or portions of the common user interface 134 could be located in a position that is accessible from outside the cowl.

Figures 6, 7:
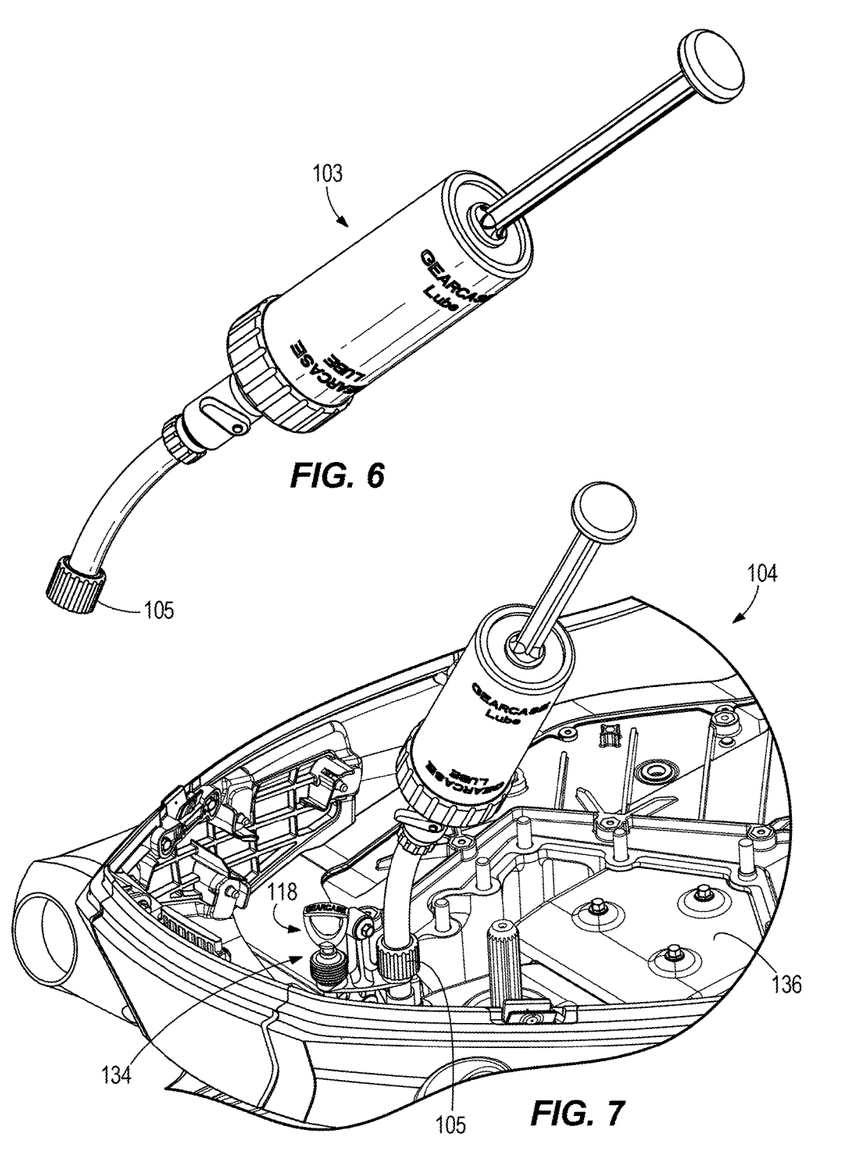
FIG. 6 is a perspective view of a lubrication fill device.
FIG. 7 is a perspective view of the lubrication fill device as lubrication is added to the apparatus.

FIGS. 6 and 7 illustrate a lubrication fill device 103 (in this example, a bottle) having a pre-measured amount of lubrication for adding to the lower gearcase 102. The type and configuration of the lubrication fill device 103 can vary from that shown. In other examples, the lubrication fill device 103 can include a bag that contains the lubricant, instead of the illustrated bottle. As shown in FIG. 7, a correct amount of lubrication can be easily added to the lower gearcase 102 by removing the removable cap 132 and connecting the dispensing end 105 of the lubrication fill device 103 to the lubrication fill conduit 128. Typically, to enable easier lubrication filling, the dipstick 118 should be at least partially removed from the lubrication fill conduit 128 to sufficiently vent the lower gearcase 102 to atmosphere.

Figure 8:
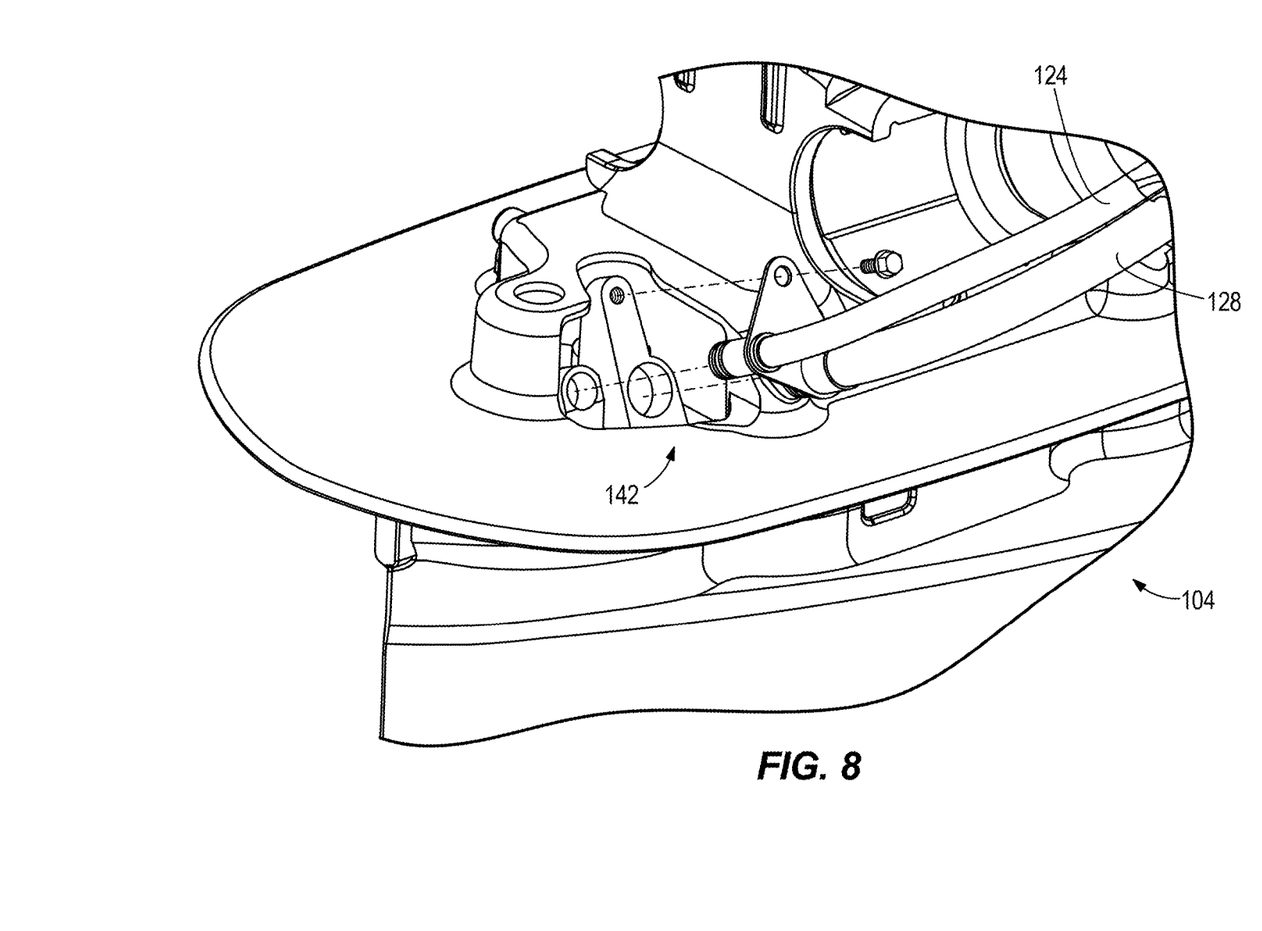
FIG. 8 is a perspective view of a quick connect fitting of the apparatus.

As shown in FIG. 8, the first portion 124 of the dipstick conduit 120 and the lubrication fill conduit 128 are removably connected to the dipstick opening 122 and the lubrication fill opening 130, respectively, on the lower gearcase 102. The type of connection can vary from that which is shown. In the illustrated example, a male-female quick connect fitting 142 connects the first portion 124 of the dipstick conduit 120 and the lubrication fill conduit 128 to the dipstick opening 122 and lubrication fill opening 130, respectively, in a fluid seal-tight engagement. The quick connect fitting 142 thus allows easier service of the outboard marine engine 104, including assembly and disassembly of parts, etc.

Figure 9:
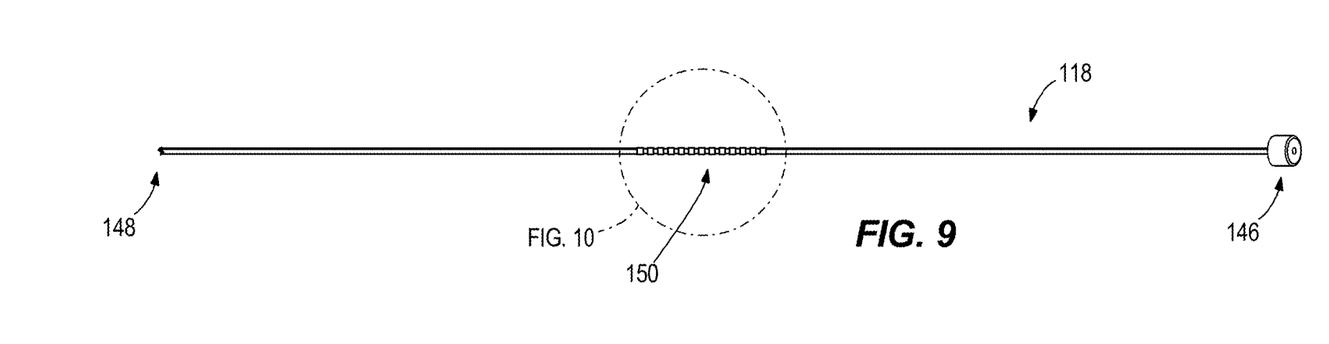
FIG. 9 is a perspective view of a dipstick according to the present disclosure.
Figure 10:
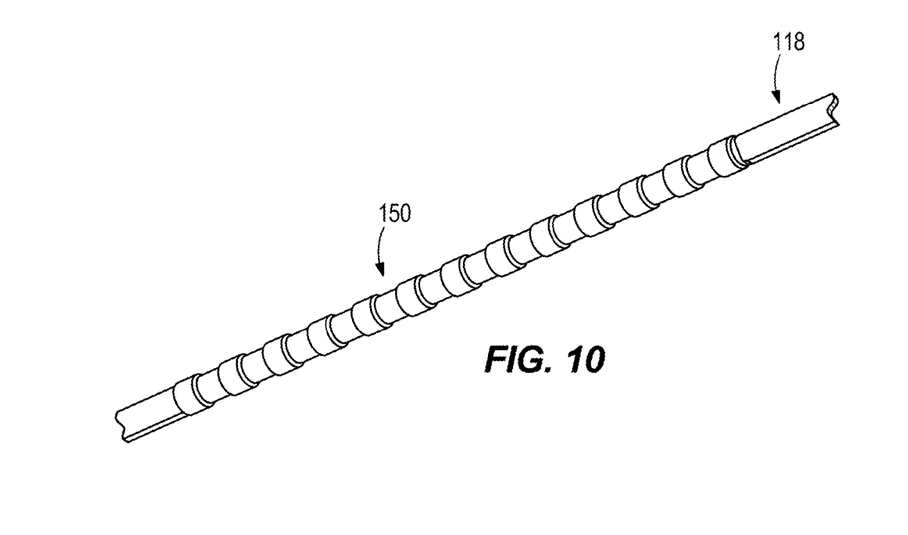
FIG. 10 is a detailed view of a friction surface on the dipstick shown in FIG. 9.

FIGS. 9 and 10 depict one example of a dipstick 118 according to the present disclosure. The dipstick 118 is advantageously flexible in three dimensions along its length between its opposite ends so that the dipstick 118 can be inserted into the first portion 124 and second portion 126 of the dipstick conduit 120, along a circuitous path, as shown for example in FIGS. 3 and 4, having bends in three dimensions. The dipstick 118 includes a handle 146, a free end 148, and a friction surface 150 located between the handle 146 and the free end 148. The friction surface 150 is configured to facilitate safe manual gripping of the dipstick 118 by a user during visual inspection of the lubrication levels. The type and configuration of the dipstick can vary from that shown and in other examples can include an electronic dipstick of known configuration.

The present disclosure thus provides a method of servicing lubrication in a lower gearcase of an outboard marine engine. The method includes providing a dipstick that extends into a lower gearcase of the outboard marine engine via a dipstick conduit. The method further includes removing the dipstick from the dipstick conduit. The method further includes removing the dipstick from the dipstick conduit and visually inspecting the dipstick to thereby determine a level of lubrication in the gearcase. The method can further include opening a fill opening on the lower gearcase to thereby vent the lower gearcase and applying a vacuum to the dipstick conduit to thereby remove lubrication from the lower gearcase. The method can further include filling the lower gearcase with a new lubrication via the fill opening.

In the above description, certain terms have been used for brevity, clarity, and understanding. No unnecessary limitations are to be inferred therefrom beyond the requirement of the prior art because such terms are used for descriptive purposes and are intended to be broadly construed. The different apparatuses and method steps described herein may be used alone or in combination with other apparatuses and methods. It is to be expected that various equivalents, alternatives and modifications are possible within the scope of the appended claims.

What is claimed is:

1. An outboard marine engine comprising:
    an internal combustion engine;
    a lower gearcase;
    a set of gears disposed in the lower gearcase, the set of gears being configured to transfer power from the internal combustion engine to drive a propulsor to generate a thrust on the outboard marine engine;
    a dipstick that extends into the lower gearcase, wherein the dipstick is removable from the lower gearcase and configured to indicate a level of lubrication in the lower gearcase;
    a dipstick opening on the lower gearcase, wherein the dipstick extends through the dipstick opening;
    a dipstick conduit connected to the dipstick opening, wherein the dipstick extends into the dipstick conduit;
    a lubrication fill opening on the lower gearcase;
    a lubrication fill conduit connected to the lubrication fill opening and disposed at least partially outside of the lower gearcase; and
    an adapter plate disposed between the lower gearcase and the internal combustion engine, wherein the dipstick extends through the adapter plate and wherein the dipstick and lubrication fill conduit are accessible on an opposite side of the adapter plate with respect to the lower gearcase.

2. The outboard marine engine according to claim 1, further comprising a removable cap which in a closed position closes the lubrication fill opening to atmosphere and in an open position opens the lubrication fill opening to atmosphere.

3. The outboard marine engine according to claim 2, wherein the dipstick conduit and lubrication fill conduit are configured such that placing the removable cap in the open position and applying suction to the dipstick conduit removes lubrication from the lower gearcase via the dipstick conduit.

4. The outboard marine engine according to claim 1, further comprising a top cowl that covers the internal combustion engine, wherein the dipstick is positioned under the top cowl such that the dipstick is exposed when the top cowl is opened.

5. The outboard marine engine according to claim 1, wherein the dipstick conduit and the lubrication fill conduit are removably connected to the dipstick opening and the lubrication fill opening, respectively, on the lower gearcase.

6. The outboard marine engine according to claim 5, further comprising a male-female quick connect fitting that removably connects the dipstick conduit and the lubrication fill conduit to the dipstick opening and lubrication fill opening, respectively, in a fluid seal-tight engagement.

7. The outboard marine engine according to claim 1, wherein the dipstick comprises a length defined between opposite ends and wherein the dipstick is flexible along the length in three dimensions.

8. The outboard marine engine according to claim 1, wherein the dipstick comprises a handle, a free end, and a friction surface located between the handle and the free end, wherein the friction surface is configured to facilitate manual gripping of the dipstick by a user.

9. An outboard marine engine comprising:
    an internal combustion engine;
    a lower gearcase;
    a set of gears disposed in the lower gearcase, the set of gears being configured to transfer power from the internal combustion engine to drive a propulsor to generate a thrust on the outboard marine engine;
    a dipstick that extends into the lower gearcase, wherein the dipstick is removable from the lower gearcase and configured to indicate a level of lubrication in the lower gearcase;
    a dipstick opening on the lower gearcase, wherein the dipstick extends through the dipstick opening;
    a dipstick conduit connected to the dipstick opening, wherein the dipstick extends into the dipstick conduit; and
    a lubrication pump disposed on the dipstick conduit in the outboard marine engine, wherein the lubrication pump is configured to pump lubrication through the lower gearcase.

10. The outboard marine engine according to claim 9, wherein the lubrication pump is operated by rotation of the dipstick conduit.

11. The outboard marine engine according to claim 10, wherein the internal combustion engine causes rotation of a driveshaft to thereby drive the propulsor via the set of gears; and further comprising a gear on the dipstick conduit, wherein rotation of the driveshaft causes rotation of the gear, which thereby causes said rotation of the dipstick conduit to thereby operate the lubrication pump.

* * * * *